(12) United States Patent
Walker et al.

(10) Patent No.: US 7,484,172 B2
(45) Date of Patent: *Jan. 27, 2009

(54) SYSTEM AND METHOD FOR PROVIDING A CUSTOMIZED INDEX WITH HYPER-FOOTNOTES

(75) Inventors: Jay S. Walker, Ridgefield, CT (US); Thomas M. Sparico, New York, NY (US); James A. Jorasch, Stamford, CT (US); Russell P. Sammon, San Francisco, CA (US); Michael D. Downs, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 574 days.

This patent is subject to a terminal disclaimer.

(21) Appl. No.: 10/095,538

(22) Filed: Mar. 11, 2002
(Under 37 CFR 1.47)

(65) Prior Publication Data

US 2003/0004999 A1    Jan. 2, 2003

Related U.S. Application Data

(63) Continuation-in-part of application No. 08/862,250, filed on May 23, 1997, now Pat. No. 6,377,963.

(51) Int. Cl.
*G06F 15/00* (2006.01)
*G06F 17/00* (2006.01)
*G06F 7/00* (2006.01)

(52) U.S. Cl. .................. 715/530; 715/513; 715/537; 707/104.1

(58) Field of Classification Search ............ 715/530, 715/513, 537, 241, 255, 266; 725/537; 707/104.1
See application file for complete search history.

(56) References Cited

U.S. PATENT DOCUMENTS

| 4,109,938 A | 8/1978 | Mitchell et al. ............... 283/43 |
| 4,272,327 A | 6/1981 | Logan ......................... 283/1 B |
| 4,352,012 A | 9/1982 | Verderber et al. ........... 235/487 |
| 4,532,554 A | 7/1985 | Skala ......................... 358/257 |
| 4,549,750 A | 10/1985 | Stone et al. ................... 283/79 |
| 4,622,592 A | 11/1986 | Ikehata et al. ............... 358/257 |
| 4,654,728 A | 3/1987 | Lunsford .................... 360/74.1 |
| 4,686,704 A | 8/1987 | Kamada et al. ............... 382/61 |

(Continued)

OTHER PUBLICATIONS

Lin, Xia, "Graphical Table of Contents", DL '96, Bethesda, MD, © 1996, pp. 45-53 [ACM 0-89791-830-4/96/03].*

(Continued)

*Primary Examiner*—John Breene
*Assistant Examiner*—Robert Stevens
(74) *Attorney, Agent, or Firm*—Walker Digital Management, LLC

(57) ABSTRACT

According to some embodiments, a method may include providing a periodical index customized for a subscriber. The method may comprise, for example, determining first data corresponding to content of at least one issue of a periodical, determining customized index data, in which the customized index data is based on the first data and at least one preference associated with a subscriber to the periodical, and outputting a customized index for the subscriber, the customized index including the customized index data, in which the customized index is separate from the content of the at least one issue.

32 Claims, 13 Drawing Sheets

U.S. PATENT DOCUMENTS

| | | | |
|---|---|---|---|
| 4,941,170 A | 7/1990 | Herbst | 379/100 |
| 5,001,572 A | 3/1991 | Hashimoto et al. | 358/440 |
| 5,025,610 A * | 6/1991 | Graushar | 53/411 |
| 5,029,830 A | 7/1991 | Quadracci | 270/52 |
| 5,080,337 A | 1/1992 | Mayer et al. | 270/1.1 |
| 5,083,816 A | 1/1992 | Folga et al. | 283/81 |
| 5,097,418 A | 3/1992 | Nurse et al. | 364/419 |
| 5,107,656 A | 4/1992 | Katz et al. | 53/131.4 |
| 5,114,128 A * | 5/1992 | Harris et al. | 270/1.03 |
| 5,115,326 A | 5/1992 | Burgess et al. | 358/440 |
| 5,144,562 A * | 9/1992 | Stikkelorum et al. | 700/223 |
| 5,189,863 A | 3/1993 | Pozzi | 53/411 |
| 5,197,262 A | 3/1993 | Katz et al. | 53/550 |
| 5,241,671 A | 8/1993 | Reed et al. | 395/600 |
| 5,249,827 A | 10/1993 | Olson | 283/36 |
| 5,265,065 A | 11/1993 | Turtle | 395/600 |
| 5,267,821 A | 12/1993 | Bodart et al. | 412/11 |
| 5,299,134 A | 3/1994 | Speckhart et al. | 364/478 |
| 5,345,551 A | 9/1994 | Shelley et al. | 395/157 |
| 5,404,505 A | 4/1995 | Levinson | 395/600 |
| 5,439,340 A | 8/1995 | Volkmann | 412/11 |
| 5,440,678 A * | 8/1995 | Eisen et al. | 715/537 |
| 5,444,779 A * | 8/1995 | Daniele | 399/366 |
| 5,455,409 A | 10/1995 | Smith et al. | 235/385 |
| 5,468,085 A * | 11/1995 | Kline | 402/79 |
| 5,483,651 A | 1/1996 | Adams et al. | 395/600 |
| 5,496,071 A * | 3/1996 | Walsh | 283/70 |
| 5,502,637 A | 3/1996 | Beaulieu et al. | 364/408 |
| 5,503,435 A * | 4/1996 | Kline | 283/67 |
| 5,506,984 A | 4/1996 | Miller | 395/600 |
| 5,521,364 A | 5/1996 | Kimura et al. | 255/383 |
| 5,521,815 A | 5/1996 | Rose, Jr. | 364/409 |
| 5,523,945 A | 6/1996 | Satoh et al. | 364/419.08 |
| 5,526,257 A | 6/1996 | Lerner | 364/401 |
| 5,530,852 A | 6/1996 | Meske, Jr. et al. | 395/600 |
| 5,608,542 A * | 3/1997 | Krahe et al. | 358/449 |
| 5,641,182 A | 6/1997 | Schwandt | 283/36 |
| 5,675,788 A | 10/1997 | Husick et al. | 395/615 |
| 5,685,003 A | 11/1997 | Peltonen et al. | 395/793 |
| 5,694,546 A | 12/1997 | Reisman | 395/200.9 |
| 5,706,493 A | 1/1998 | Sheppard, II | 395/601 |
| 5,717,923 A * | 2/1998 | Dedrick | 707/102 |
| 5,724,567 A | 3/1998 | Rose et al. | 395/602 |
| 5,727,156 A | 3/1998 | Herr-Hoyman et al. | 395/200.49 |
| 5,740,425 A * | 4/1998 | Povilus | 707/100 |
| 5,748,954 A | 5/1998 | Mauldin | 395/610 |
| 5,749,081 A | 5/1998 | Whiteis | 707/102 |
| 5,761,485 A | 6/1998 | Munyan | 395/500 |
| 5,761,662 A | 6/1998 | Dasan | 707/10 |
| 5,768,521 A | 6/1998 | Dedrick | 395/200.54 |
| 5,787,416 A * | 7/1998 | Tabb et al. | 707/2 |
| 5,794,207 A | 8/1998 | Walker et al. | 705/23 |
| 5,796,393 A | 8/1998 | MacNaughton et al. | 345/329 |
| 5,796,395 A | 8/1998 | de Hond | 345/331 |
| 5,796,952 A | 8/1998 | Davis et al. | 395/200.54 |
| 5,799,268 A | 8/1998 | Boguraev | 704/9 |
| 5,799,285 A | 8/1998 | Klingman | 705/26 |
| 5,819,273 A | 10/1998 | Vora et al. | 707/10 |
| 5,832,472 A | 11/1998 | Sheppard, II | |
| 5,835,087 A | 11/1998 | Herz et al. | 345/327 |
| 5,835,923 A | 11/1998 | Shibata et al. | 707/526 |
| 5,857,181 A | 1/1999 | Augenbraun et al. | 707/2 |
| 5,870,767 A * | 2/1999 | Kraft, IV | 715/501.1 |
| 5,900,004 A * | 5/1999 | Gipson | 715/530 |
| 5,901,287 A | 5/1999 | Bull et al. | 395/200.48 |
| 5,907,836 A | 5/1999 | Sumita et al. | 707/2 |
| 5,953,732 A | 9/1999 | Meske, Jr. et al. | |
| 5,959,944 A * | 9/1999 | Dockes et al. | 369/84 |
| 5,970,505 A * | 10/1999 | Ebrahim | 715/501.1 |
| 5,974,004 A * | 10/1999 | Dockes et al. | 715/727 |
| 5,995,976 A | 11/1999 | Walker et al. | 707/104 |
| 6,002,798 A * | 12/1999 | Palmer et al. | 382/176 |
| 6,009,410 A | 12/1999 | LeMole et al. | 705/14 |
| 6,014,654 A | 1/2000 | Ariyoshi | 706/62 |
| 6,014,663 A * | 1/2000 | Rivette et al. | 707/4 |
| 6,055,513 A | 4/2000 | Katz et al. | 705/26 |
| 6,178,411 B1 * | 1/2001 | Reiter | 705/408 |
| 6,213,457 B1 * | 4/2001 | Schlough | 270/58.23 |
| 6,240,407 B1 * | 5/2001 | Chang et al. | 707/2 |
| 6,266,649 B1 * | 7/2001 | Linden et al. | 705/26 |
| 6,279,013 B1 * | 8/2001 | LaMarca et al. | 715/500 |
| 6,356,897 B1 * | 3/2002 | Gusack | 707/4 |
| 6,539,405 B1 * | 3/2003 | Honig | 715/501.1 |
| 6,758,397 B2 * | 7/2004 | Catan | 235/385 |
| 6,766,363 B1 * | 7/2004 | Rothschild | 709/219 |
| 2001/0043364 A1 * | 11/2001 | Messner et al. | 358/1.15 |
| 2002/0024532 A1 * | 2/2002 | Fables et al. | 345/700 |
| 2002/0035697 A1 * | 3/2002 | McCurdy et al. | 713/200 |
| 2002/0040374 A1 * | 4/2002 | Kent | 707/516 |
| 2002/0049781 A1 * | 4/2002 | Bengtson | 707/500.1 |
| 2002/0054073 A1 * | 5/2002 | Yuen | 345/727 |
| 2002/0062302 A1 * | 5/2002 | Oosta | 707/1 |
| 2002/0069240 A1 * | 6/2002 | Berk | 709/203 |
| 2002/0073177 A1 * | 6/2002 | Clark et al. | 709/219 |
| 2002/0083053 A1 * | 6/2002 | Richard et al. | 707/3 |
| 2002/0087944 A1 * | 7/2002 | David | 717/100 |
| 2002/0116421 A1 * | 8/2002 | Fox et al. | 707/526 |
| 2002/0184093 A1 * | 12/2002 | Cherry et al. | 705/14 |
| 2003/0023594 A1 * | 1/2003 | Ramamurthi | 707/7 |
| 2003/0149618 A1 * | 8/2003 | Sender et al. | 705/14 |
| 2003/0223089 A1 * | 12/2003 | Laursen et al. | 358/1.15 |

OTHER PUBLICATIONS

Mulvany, Nancy C., "What's Going on in Indexing?", ACM SIGDOC Asterisk Journal of Computer Documentation, vol. 21 issue 2, May 1997, pp. 10-15 (plus citation page).*

Microsoft Computer Dictionary, 5th Edition, Microsoft Press, Redmond, WA, © 2002. p. 190.*

Kalina, Dave, "Banta", Snap, Sep. 2005, pp. 1-12.*

Wellisch, Hans H., "Book and Periodical Indexing", Journal of the American Society for Information Science, vol. 45, No. 8, John Wiley & Sons, Inc., Sep. 1994, pp. 620-627.*

Bell, Hazel K., "From Herbals to Hotbot: The Development of Journal Indexing", Learned Publishing, vol. 14, No. 2, Apr. 2001, pp. 123-130.*

Mobasher, Bamshad, et al., "Automatic Personalization Based on Web Mining", Communications of the ACM, vol. 43, No. 8, Aug. 2000, pp. 142-151.*

Morin, Jean-Henry, et al., "Hypernews: A Media Application for the Commercialization of an Electronic Newspaper", Proc. of the 1998 ACM Symposium on Applied Computing, Feb. 1998, pp. 696-705.*

Schafer, J. Ben, et al., "Recommender Systems in E-Commerce", Proc. of the 1st ACM Conference on Electronic Commerce, Nov. 1999, pp. 158-166.*

Fidel, Raya, "User-Centered Indexing", Journal of the American Society for Information Science, vol. 45, Issue 8, John Wiley & Sons, © 1994, pp. 572-576.*

"How Old is Your Child?", Child, The Essential Guide For Today's Parents, Oct. 1996.

"5 Month-Old, Your child Now", Child, The Essential Guide For Today's Parents, Nov. 1996.

Foltz et al., "Personalized Information Delivery: An Analysis of Information Filtering Methods" Communications of the ACM, Dec. 1992, pp. 51-60, 10pp.

Office Action for U.S. Appl. No. 08/862,250 dated: Mar. 24, 2000, 18 pp.

Office Action for U.S. Appl. No. 08/862,250 dated: Jun. 28, 1999, 15pp.

Interview Summary for U.S. Appl. No. 08/862,250 dated: May 1, 2000, 1pg.

Advisory Action for U.S. Appl. No. 08/862,250 dated: Jun. 6, 2000, 1pg.

Office Action for U.S. Appl. No. 08/862,250 dated: Nov. 28, 2000, 19pp.
Interview Summary for U.S. Appl. No. 08/862,250 dated: Mar. 28, 2001, 2pg.
Office Action for U.S. Appl. No. 08/862,250 dated: Jun. 19, 2001, 20pp.
Interview Summary of U.S. Appl. No. 08/862,250 dated Aug. 29, 2001, 1pg.
Notice of Allowability for U.S. Appl. No. 08/862,250 dated: Nov. 19, 2001, 2pp.
Office Action for U.S. Appl. No. 08/729,426 dated: Apr. 2, 1998, 10 pp.
Office Action for U.S. Appl. No. 08/729,426 dated: Dec. 9, 1998, 8pp.
Notice of Allowability for U.S. Appl. No. 08/729,426 dated: Aug. 16, 1999, 5pp.
Office Action for U.S. Appl. No. 09/422,719 dated: Jun. 4, 2001, 9pp.
Office Action for U.S. Appl. No. 09/422,719 dated: Feb. 11, 2002, 5pp.
Notice of Allowability for U.S. Appl. No. 09/422,719 dated: Mar. 22, 2002, 3pp.

* cited by examiner

251

| MAGAZINE ID NUMBER | MAGAZINE NAME | PERIODS |
|---|---|---|
| T34 | TIME | WEEKLY |
| P21 | PEOPLE | WEEKLY |
| C34 | CRAIN'S | WEEKLY |

FIG. 3A

| SUBSCRIBER NUMBER | NAME | MAGAZINE ID NUMBER | INDEX NUMBER | SUBSCRIPTION EXPIRATION DATE | ADDRESS | PHONE NUMBER | CREDIT CARD NUMBER |
|---|---|---|---|---|---|---|---|
| 4368 | T. FORREST | T34 | 541 | 1/1/98 | 1 RED DR. | (203)-604-3271 | 4028 1255 5689 8555 |
| 4369 | B. GREEN | T34 | 549 | 2/12/98 | 2 BLUE RD. | (203)-637-4210 | 9141 4565 5582 5466 |
| 4370 | L. KELLY | T34 | 603 | 3/23/98 | 3 GREEN DR. | (203)-914-7386 | 4120 2316 5646 8791 |

| INDEX NUMBER | SUBSCRIBER NUMBER | PREFERENCES | SUBSCRIBER CONTENT CODE |
|---|---|---|---|
| 541 | 4368 | SPACE, NASA | 3231 |
| 549 | 4369 | DINOSAURS, ANTHROPOLOGY | 4610 |
| 603 | 4370 | SPORTS, FINANCE | 5210 |

| MAGAZINE ID NUMBER | ISSUE NUMBER | SUBSCRIBER NUMBER | INDEX NUMBER | INDEXED ARTICLES |
|---|---|---|---|---|
| T34 | 467 | 4368 | 541 | "THE ..." |
| T34 | 467 | 4369 | 549 | "FINANCE ..." |
| T34 | 467 | 4370 | 603 | "POLITICS ..." |
| T34 | 467 | 4925 | 270 | B01; Z02 |
| T34 | 467 | 4863 | 540 | 02-A7 |

FIG. 3E ent with the articles. Often the reader must dedicate valuable time

SYSTEM AND METHOD FOR PROVIDING A CUSTOMIZED INDEX WITH HYPER-FOOTNOTES

CROSS-REFERENCE TO RELATED APPLICATIONS

This application is a continuation-in-part of:
(i) U.S. patent application Ser. No. 08/862,250, filed on May 23, 1997, now U.S. Pat. No. 6,377,963, incorporated herein by reference.

FIELD OF THE INVENTION

The present invention relates to periodicals. More specifically, the invention relates to a method and system for managing information presented in periodicals by creating personalized indexes.

BACKGROUND OF THE INVENTION

The sheer volume of information provided in magazines often overwhelms a reader's ability to process it. It is typical for a single magazine to include over one hundred articles, with a dozen or more directed to a single topic. Printed indices and tables of contents may themselves run for many pages. If a reader desires to receive current information, for example, on a particular person or company, he may find a dozen references to that company or person indexed within a single magazine. Often the reader must dedicate valuable time evaluating all of the content in order to determine which of it satisfies his particular interests. A typical index only provides the page numbers where the name or company is mentioned, and typically does not describe what the article relates to or the content in which a name or company is mentioned.

Abstract services are available which produce abstracts of magazine articles covering specific areas of interest to information consumers. These abstracts are distributed in accordance with reader profiles and are used to identify articles of likely interest to the consumer. Upon request, the reader may obtain full copies of the articles. Such services suffer, however, from the obvious drawback that access to the full article requires a separate time-consuming action and a positive effort on the part of the consumer.

At least one magazine, *American Baby*, attempts to include custom editorial matter. Profile data is collected from subscribers for the purpose of providing targeted content to individual subscribers. If, for example, a subscriber is identified as having a three-months old infant, then an article relevant to such an infant may be specially inserted into that subscriber's magazine along with the standard content. The inclusion of that insert is noted on the cover.

Such a process suffers from the significant shortcoming of not making it any easier to find other relevant articles in the magazine. The magazine still contains hundreds of pages of standard-content information that, as described above, contributes to the information overload of the reader.

BRIEF DESCRIPTION OF THE DRAWINGS

The accompanying drawings are included to provide a further understanding of the invention and, together with the Detailed Description, serve to explain the principles of the invention.

In the drawings:

FIGS. 3A-3G show sample fields of magazine database 251, content database 252, subscriber database 253, preferences database 254, issue database 255, hyper-footnote database 256, and supplemental information database 258, respectively, contained in data storage device 250 shown in FIG. 2;

DETAILED DESCRIPTION

Introduction

Figure 1:
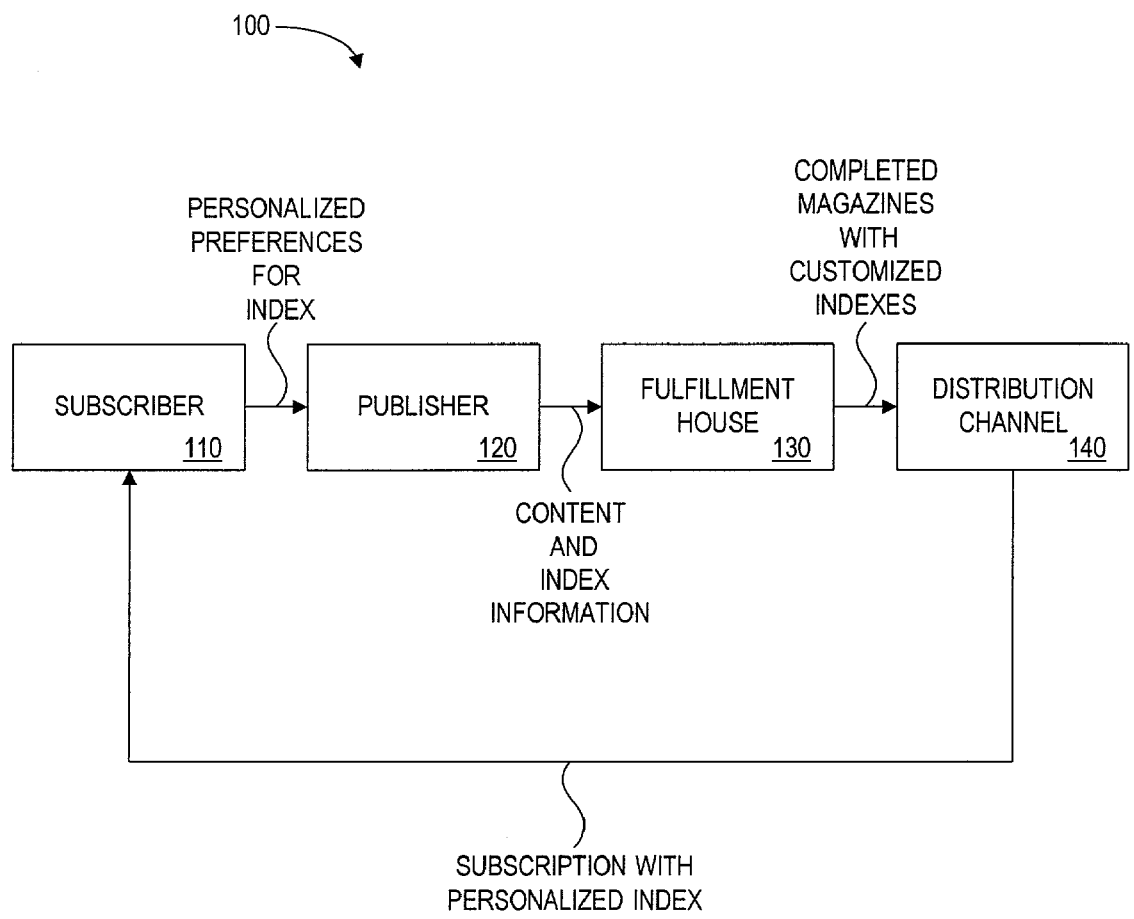
FIG. 1 is a block diagram of a system consistent with the invention.

In accordance with various embodiments of the present invention, one or more hyper-footnotes may be included in a customized index. Alternatively, or in addition, one or more references to a hyper-footnote (e.g., "See the hyper-footnote at page 6, paragraph 2.") may be included in a customized index. These embodiments thus allow a subscriber of a periodical to quickly identify whether any supplemental information associated with the standard printed content of a periodical is of interest to the subscriber.

As used herein, "hyper-footnote" means a code or other indicator identifying a limited portion of information in standard printed content of a periodical for which supplemental information exists. The code, or a reference to the code, may be printed or embedded in the midst of an article or as described more fully herein below it may be otherwise discernable or calculable by a reader, and, alternatively or in addition, may be included in an index customized for a subscriber.

Hyper-footnotes allow information gatherers such as newspapers a means of providing information that would otherwise be wasted. They can now provide subscribers magazines, newspapers, or similar printed media with the capability to obtain supplemental information on selected segments of information contained in the articles. Readers may obtain the supplemental information directly from publishers that print the articles, operators of electronic databases containing the supplemental information, or third party intermediaries handling requests for supplemental information.

Hyper-footnotes may be embedded by a publisher in the midst of at least one printed article as a code that is physically positioned to identify a limited portion of information in the printed article. Hyper-footnotes may also be included in a customized index for a subscriber in such a way as to identify supplemental information related to a limited portion of information in a printed article that may be of interest to the reader. A reader may use the code to indicate further interest in supplemental information located in an electronic database, and to select a method of delivery whereby the supplemental information in the database can be delivered the reader. For example, using the code may permit the reader to access a remote electronic database containing supplemental information related to the limited portion of information in the article, utilize the code to indicate further interest in the supplemental information, and select a method of delivering the supplemental information in the database to the reader.

In accordance with other various embodiments of the present invention, a subscriber of a periodical is able to quickly identify whether an issue of the periodical contains standard printed content of interest to the subscriber and what that standard printed content is. The subscriber provides a list of personal preferences indicative of standard printed content that the subscriber is interested in reading. The publisher of the periodical compares the personal preferences with content information for a particular issue of the periodical to determine whether the issue contains standard printed content matching the subscriber's personal preferences. The publisher then creates a customized index, which a fulfillment house attaches to the periodical mailed to the particular subscriber.

Various preferred embodiments of the invention involve attaching to a periodical an "outer wrap," on which the customized index is printed. As used in this specification, the term "outer wrap" generally refers to any article, attachable to a periodical, on which an index may be printed. Examples of an "outer wrap" include, but are not limited to, a paper or cardboard wrapper in which the periodical is provided, an adhesive label, an envelope, a card, and a poly bag outer cover. In alternative embodiments, the customized index may be printed directly on the outside or inside of the periodical or printed on an insert, such as a bind-in card, affixed to the inside of the periodical. Further, it is to be understood that the index could be delivered via facsimile, electronic mail, phone (using an IVRU), or the Internet.

In addition, unless otherwise indicated, the term "magazine" is used in this specification interchangeably with "periodical," which refers generally to any publication or work for which one or more issues are published or for which a subscription may be obtained in any medium, such as a magazine, newspaper, journal, CD-ROM, cassette tape, video tape, and computer-readable medium. Similarly, unless otherwise indicated, the term "article" is used in this specification to mean any content, material, or writings contained in a periodical, including articles, reports, summaries, stories, songs, films, clips, and computer programs.

The term "standard printed content" refers to content contained in a periodical for general distribution and is distinguishable from specialized content, which is directed to a particular group of subscribers according to subscriber characteristics.

System

FIG. 1 illustrates system 100, according to a preferred embodiment of the invention. System 100 includes subscriber 110, publisher 120, fulfillment house 130, and distribution channel 140. As shown in FIG. 1, publisher 120 is in communication with subscriber 110 and fulfillment house 130. Distribution channel 140 receives magazines from fulfillment house 130 and delivers them to respective subscribers, such as subscriber 110.

Subscriber 110 represents a person who desires to obtain a subscription to a periodical, such as a magazine. Subscriber 110 communicates with publisher 120 by transmitting, for example, personal preference information, which identifies standard printed content of interest. Personal preference information preferably identifies attributes indicative of articles of interest and may specify, for example, the article's general subject matter (e.g., sports, politics), specific subject matter defined by key words found in the articles (e.g., companies of interest, industries of interest, people of interest, geographic areas of interest), the name of the articles' authors or creators, and the article type (e.g., editorial, product review).

Publisher 120 represents the publisher of a periodical for which subscriber 110 desires a subscription. In a preferred embodiment, publisher 120 includes a processor-based system having a central controller configured to receive personal preference information from subscriber 110 and generate appropriate index information for transmission, along with content information, to fulfillment house 130.

Figure 2:
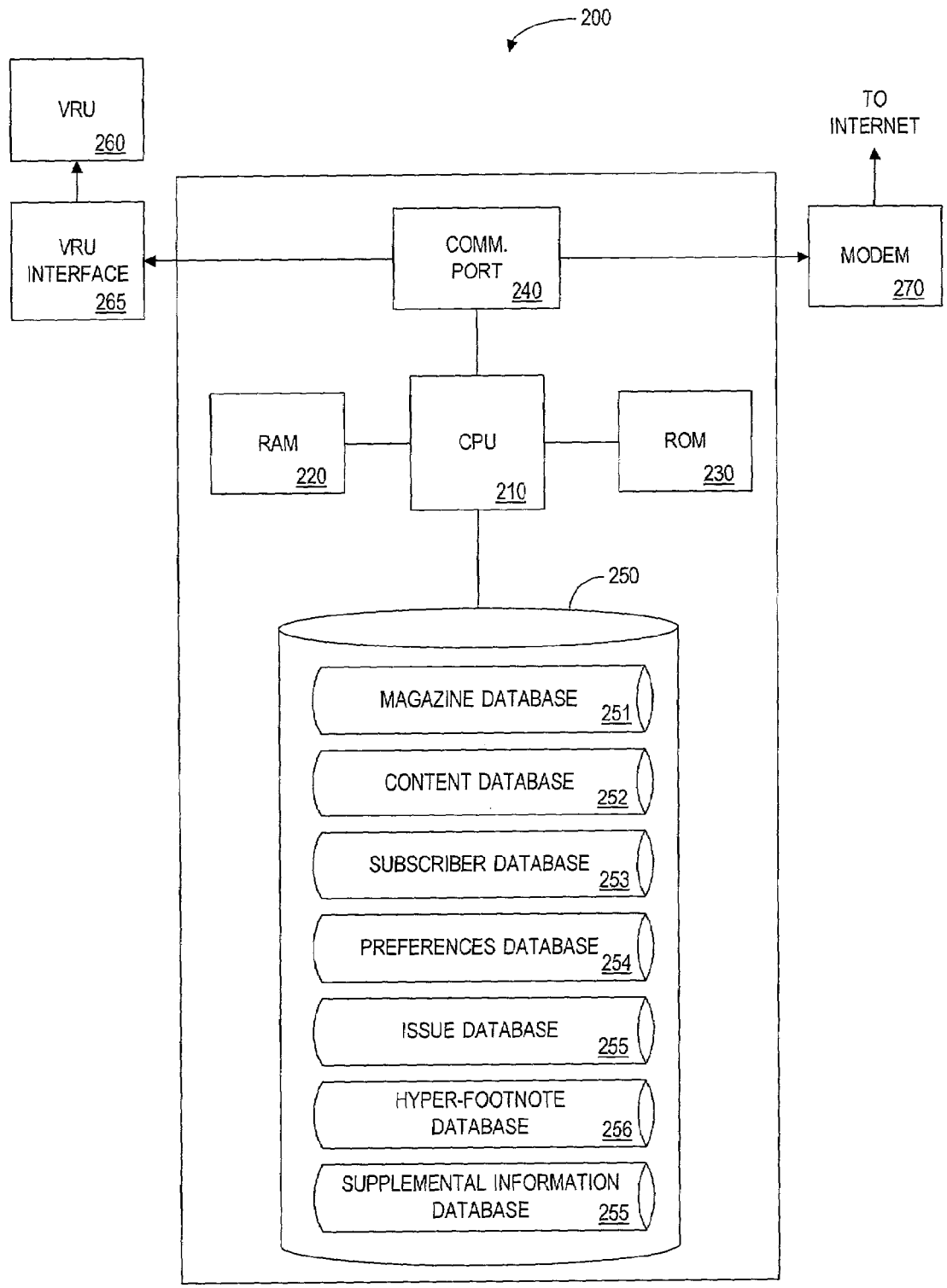
FIG. 2 is a block diagram of central controller 200 located at publisher 120 shown in FIG. 1.

FIG. 2 is a block diagram of a central controller 200 of publisher 120, according to one embodiment of the invention. Central controller 200 includes central processing unit (CPU) 210, random access memory (RAM) 220, read only memory (ROM) 230, communications port 240, and data storage device 250, which may be standard hardware components. CPU 210 is linked to each of the other elements and executes program modules stored in RAM 220, ROM 230, and/or data storage device 250 to perform operations and functions associated with central controller 200 described below. Central controller 200 may also include components to facilitate communication, such as a voice recognition unit (VRU) 260, VRU interface 265, and modem 270. Communication port 240 interfaces with VRU interface 265, which links to VRU 260, and modem 270, which links to a public switched telephone network.

Data storage device 250 maintains several databases, including magazine database 251, content database 252, subscriber database 253, preferences database 254, issue database 255, a hyper-footnote database 256, and a supplemental information database 258. Sample fields associated with these databases are described below in connection with FIGS. 3A-3G. In alternative embodiments, fewer or more fields may be included in these databases. Some of the fields described below are not needed to accomplish the invention, but are included to illustrate the types of data that may be used in conjunction with the invention. Likewise, in alternative embodiments, fewer or more databases may be used to store similar data in storage device 250.

Magazine database 251 generally contains data relating to magazines published by publisher 120. FIG. 3A illustrates a sample of the fields used in magazine database 251. The fields shown include (1) magazine ID number, (2) magazine name, and (3) periods. Magazine ID number (field 1) represents a unique identifier corresponding to a particular magazine title and is generally used by central controller 200 to specify particular magazine titles. Associated with the magazine ID number are the magazine name (field 2) and time periods (field 3) in which the particular issue was, or will be, published. Other information may also be provided in magazine database 251 to permit access to additional information relating to the magazine.

Figure 3B:
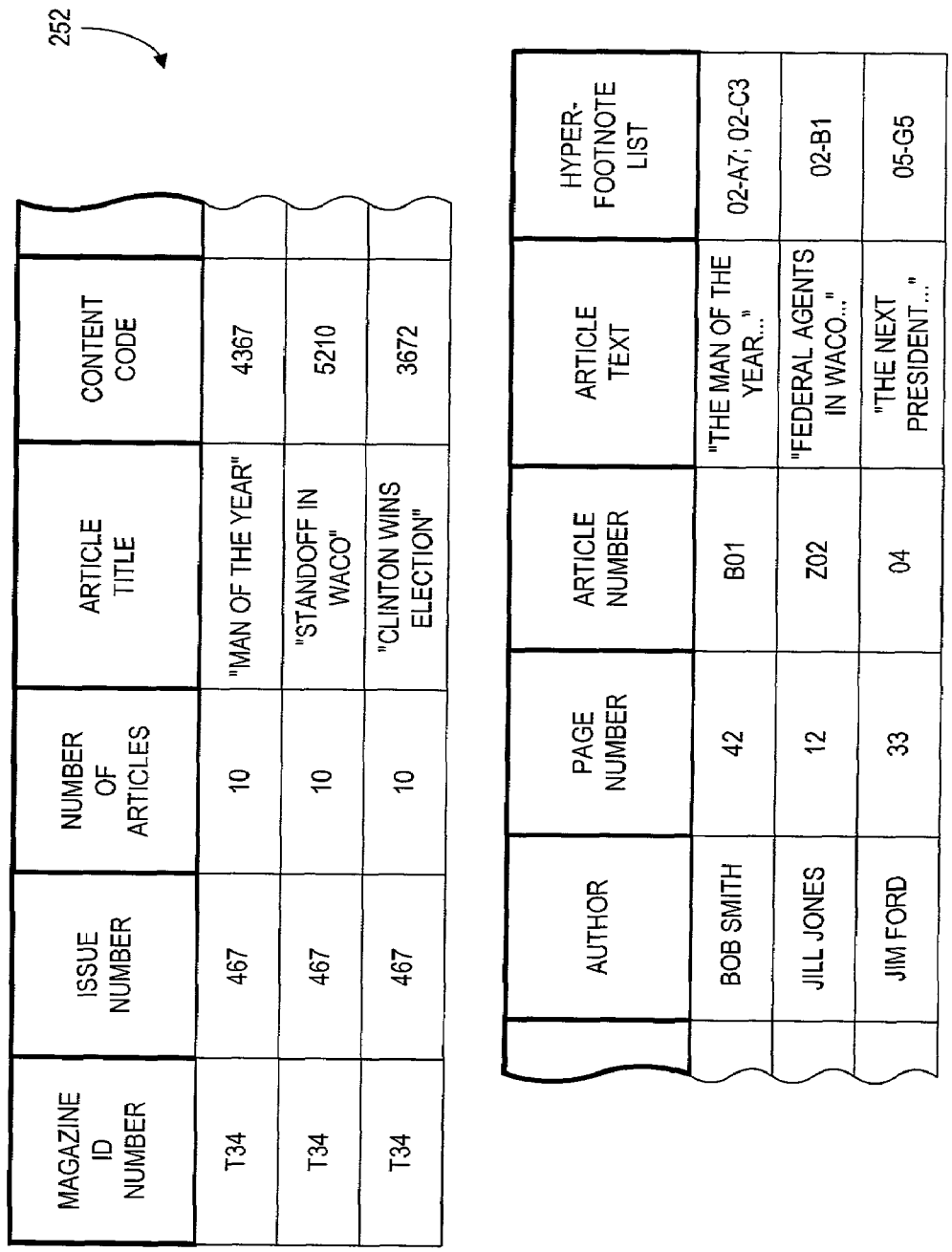

Content database 252 generally contains data relating to articles, documents, or other segments of the standard printed content contained in different magazine issues. FIG. 3B illustrates a sample of the fields in content database 252, which include (1) magazine ID number, (2) issue number, (3) number of articles, (4) article title, (5) content code, (6) author, and (7) page number. Each entry in database 252, indexed by magazine ID number and issue number, contains data relating to the content of a particular magazine issue, such as the number of articles in the issue (field 3), the articles' titles (field 4), the authors of the articles (field 6), and the articles' page numbers (field 7). Each entry may also be associated with one or more content codes (field 5), representing attributes associated with the content of the articles in a particular magazine issue. The content codes are generated according to a coding scheme that associates each content code with a unique attribute. These attributes may include an article's general subject matter (e.g., sports, politics), specific subject matter defined by key words found in the articles (e.g., companies of interest, industries of interest, people of interest, geographic areas of interest), the name of the articles' authors, and the article type (e.g., editorial, product review). For example, a content code may represent the specific subject matter of "Dinosaurs" and may be stored in correspondence with a particular issue of a magazine, such as a Time Magazine issue containing an article about dinosaurs.

Alternative or additional information may be included in content database 252. Content database 252 may include, for example, an identifier that identifies an article or other segment of standard printed content, such as article number (field 8), a unique alphanumeric used to identify an article. An article text field (field 9) may be used to store all (or a portion) of the text of an article. Accordingly, a type of intelligent search could be performed to identify content satisfying the subscriber's interests, as will be further discussed below. A hyper-footnote list (field 10) may be used to list one or more hyper-footnotes corresponding to supplemental information that is related to portions of the article.

According to various embodiments of the present invention, content database 252 contains data relating to different types of standard printed content of a periodical, such as, for example, articles, sports information, business information, classified information, real estate listings, comics, games and puzzles, letters, advertisements, information about advertisers, information about an author, information about a publisher, subscription information, and bibliographies.

Subscriber database 253 contains data relating to subscribers of the magazines and, as shown in FIG. 3C, may include several fields, including (1) subscriber number, (2) name, (3) magazine ID number, (4) index number, (5) subscription expiration date, (6) address, (7) phone number, and (8) credit card number. Subscriber numbers (field 1) allow publisher 120 to uniquely identify subscribers. The index number field (field 4) stores information indicating by number whether preferences database 254 contains preference information for particular subscribers. The remaining information relates to subscriber information, such as address, phone number, and credit card number, and subscription information, such as the magazine to which the subscriber has subscribed and the date on which the subscription expires.

Subscriber database 253 may also include fields (not shown) such as, for example, facsimile telephone number, e-mail address, credit card type and number, preferred delivery means, and account balance. The preferred delivery means is for the customer's selected method to receive requested supplemental information. Such methods may include, for example, regular mail, or a faster courier service such as Federal Express, DHL Courier, etc. Facsimile and e-mail are additional methods for delivering requested supplemental information. Another available delivery method is to send any requested supplemental information to an address on the World Wide Web.

The account balance field may be used to bill the customer if the customer has requested, for example, invoice billing. Alternatively, the account balance may be used to bill the subscriber's credit card by sending a payment request to the appropriate credit card processing company.

Preferences database 254 contains data relating to attributes indicative of magazine articles that subscribers are interested in reading and, as shown in FIG. 3D, is indexed by the index number (field 1). Each subscriber identified by subscriber number (field 2) may have one or more preferences (field 3), which identify desired attributes indicative of articles of interest. Preferences are preferably coded according to a coding scheme similar to the one used to code the content codes contained in content database 252. In an alternative embodiment, the preferences may appear in database 254 as text describing the desired attributes. Subscriber content code (field 4) designates the code (or codes) corresponding to the preferences in field 3.

FIG. 3E illustrates sample fields for data found in issue database 255, which generally contains index information for respective subscribers. Database 255, as shown in FIG. 3E, includes the following fields: (1) magazine ID number, (2) issue number, (3) subscriber number, (4) index number, and (5) indexed articles. Indexed according to magazine ID number and issue number, entries in issue database 255 contain index information for corresponding subscribers. The index number identifies, by reference to preferences database 254, information to be printed on the customized index for each subscriber, and may identify such information as article names, article numbers, hyper-footnotes, authors, article summaries, and corresponding page numbers associated with articles possessing the attributes to which the subscriber has indicated interest. The particular index information stored under field (4) may vary, however, according to the manner in which the customized index is to be constructed.

According to an alternative or additional embodiment, indexed articles (field 5) includes information to be printed on the customized index for each subscriber, and may identify such information as article names, article numbers, hyper-footnotes, authors, article summaries, and corresponding page numbers associated with articles possessing the attributes to which the subscriber has indicated interest.

The particular information stored in the indexed information field (field 5) may vary, however, according to the manner in which the customized index is to be constructed. For example, in an alternative embodiment, indexed articles (field 5) contains one or more identifiers that identify articles determined to be of interest to the subscriber. Each article identifier corresponds to an identifier stored in content database 252 (field 8), and thus may be used to retrieve information about the indexed article stored in content database 252.

One or more hyper-footnotes (or references to hyper-footnotes) may be included in a customized index. A hyper-footnote may be a code embedded in the text of the printed article or a portion of the printed article itself. In the latter situation, the hyper-footnote may be represented in the article in a variety of different ways. When using a method other than embedded codes to indicate the existence of a hyper-footnote, it may also be necessary to provide further information in the printed article, for example, a number identifying the printed article as well as the line number corresponding to the portion constituting a hyper-footnote.

Different types of hyper-footnotes may be used to distinguish between different types of supplemental information such as textual, audio, or video information. Thus, by viewing the particular hyper-footnote, the reader may determine whether the available supplemental information is text, audio, video, or some other form.

Various embodiments of the present invention thus provide a practical and economically feasible system for publishers to indicate to readers the availability of valuable supplement information, which is often developed in the routine process of business but otherwise wasted, related to information found in print material. This is accomplished by providing readers with hyper-footnotes, or references to hyper-footnotes, a simple means to identify whether supplemental information exists.

Figure 3F:
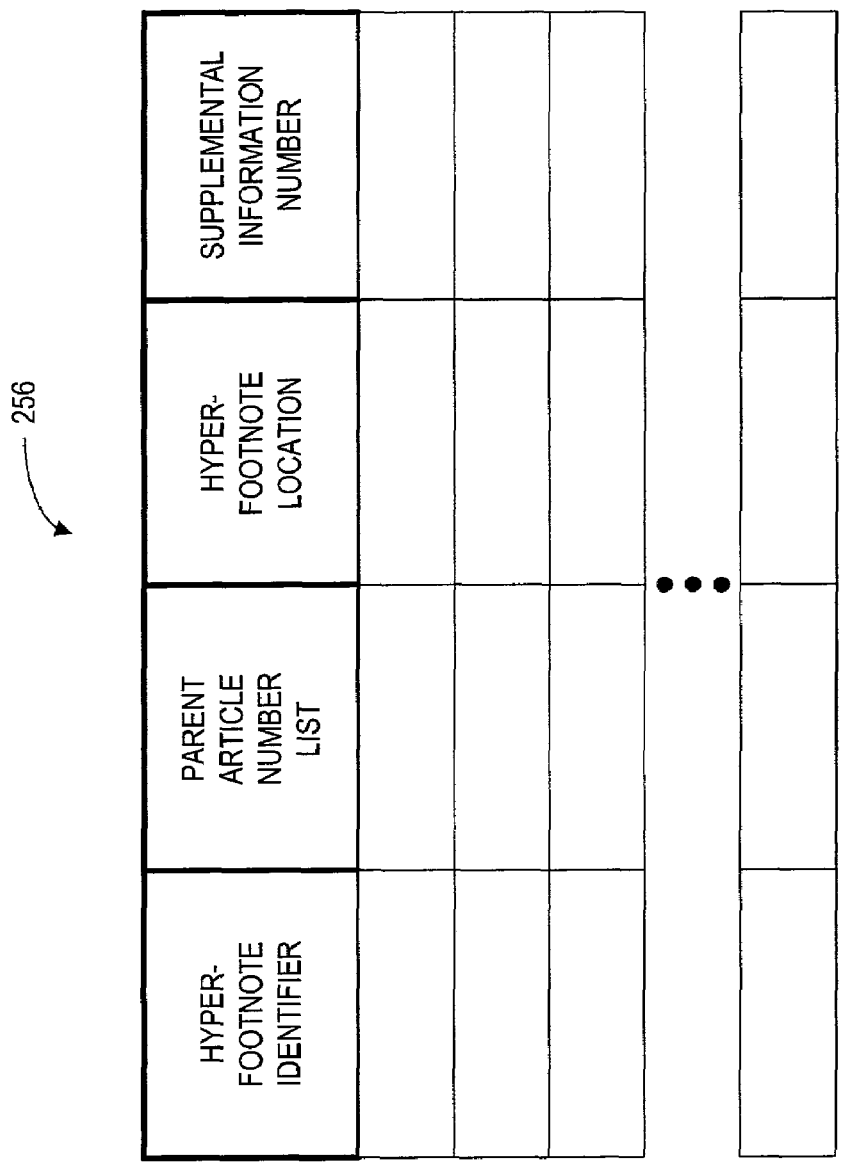
Figure 3G:
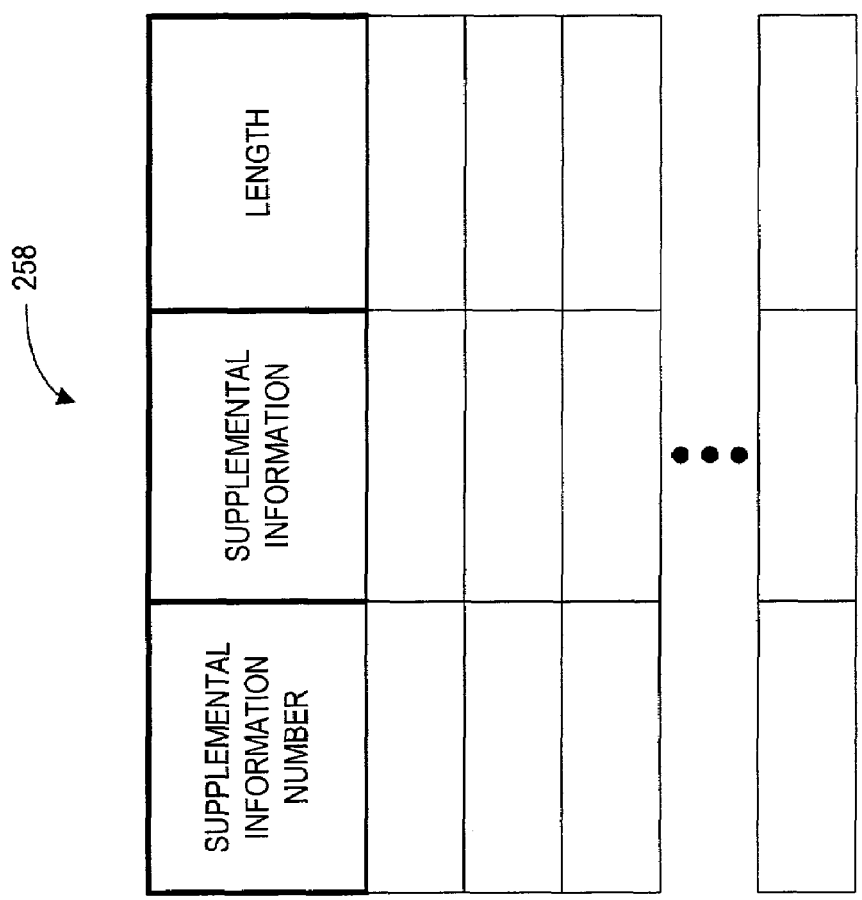

FIG. 3F depicts sample fields for information stored in hyper-footnote database 256. Hyper-footnote database 256 includes a listing of hyper-footnotes and corresponding supplemental information identifiers used to locate corresponding supplemental information in the supplemental information database 258. Hyper-footnote database 256 includes records preferably having four fields: hyper-footnote identifier (field 1), parent article number list (field 2), hyper-footnote location (field 3), and supplemental information number (field 4). Hyper-footnote identifier (field 1) is, for example, a unique alphanumeric used to identify each hyper-footnote. Hyper-footnote identifiers may be found in the hyper-footnote list for a corresponding article specified in the content database 252 (at field 10).

Parent article number list (field 2) preferably includes article numbers from content database 252 (at field 8) corresponding to each hyper-footnote in hyper-footnote database 256. One hyper-footnote may relate to one or more articles, and vice versa. Hyper-footnote list (field 10 of content database 252) for each article of content database 252 relates the article to its one or more corresponding hyper-footnotes. Parent article number list (field 2 of hyper-footnote database 256) for each hyper-footnote of hyper-footnote database 256 relates the hyper-footnote to its one or more corresponding articles.

Hyper-footnote location (field 3) for each hyper-footnote indicates the location, such as page number and line number, of the hyper-footnotes within the text of an article of content database 252. Finally, supplemental information number (field 4) preferably is a unique identifier corresponding to each hyper-footnote of hyper-footnote database 256 and specifying an entry in supplemental information database 258.

Supplemental information database 258 stores the supplemental information corresponding to portions of information in printed articles. Supplemental information database 258, depicted in FIG. 3G, preferably includes three fields: supplemental information number (field 1), supplemental information (field 2), and length of the supplemental information (field 3). Supplemental information number (field 1) for each entry of supplemental information database 258 preferably is a unique alphanumeric identifier that identifies the supplemental information. The identifier (field 1) is used to locate supplemental information corresponding to hyper-footnotes in hyper-footnote database 256. Each supplemental information record of supplemental information database 258 preferably also includes supplemental information (field 2) as well as its length (field 3). In addition to text, the supplemental information field (field 2) may contain audio, video, or another form of supplemental information to the printed text of an article. The length (field 3) is used, for example, for output control and, if so configured, for determining the cost of providing the supplemental information in response to requests.

A system and method for providing supplemental information in response to requests is described in U.S. patent application Ser. No. 09/422,719, filed on Oct. 22, 1999, which issued as U.S. Pat. No. 6,449,616 on Sep. 10, 2002, and which is incorporated herein by reference.

Fulfillment house 130 receives content and index information from publisher 120 and includes a bindery (not shown), which physically constructs magazines to which the customized indexes are attached. In a preferred embodiment, the bindery comprises a conventional facility for assembling magazines, which is controlled by a processor-based central controller 400 in a manner that facilitates the operations and functions described below. One conventional bindery utilizes a bindery line, or assembly line, in which magazine issues are constructed in stages. At the final stage, the bindery is preferably capable of attaching a customized index to a magazine by, for example, attaching a poly bag outer wrap containing the index to the magazine or printing the index directly on the magazine, according to signals from central controller 400.

Figure 4:
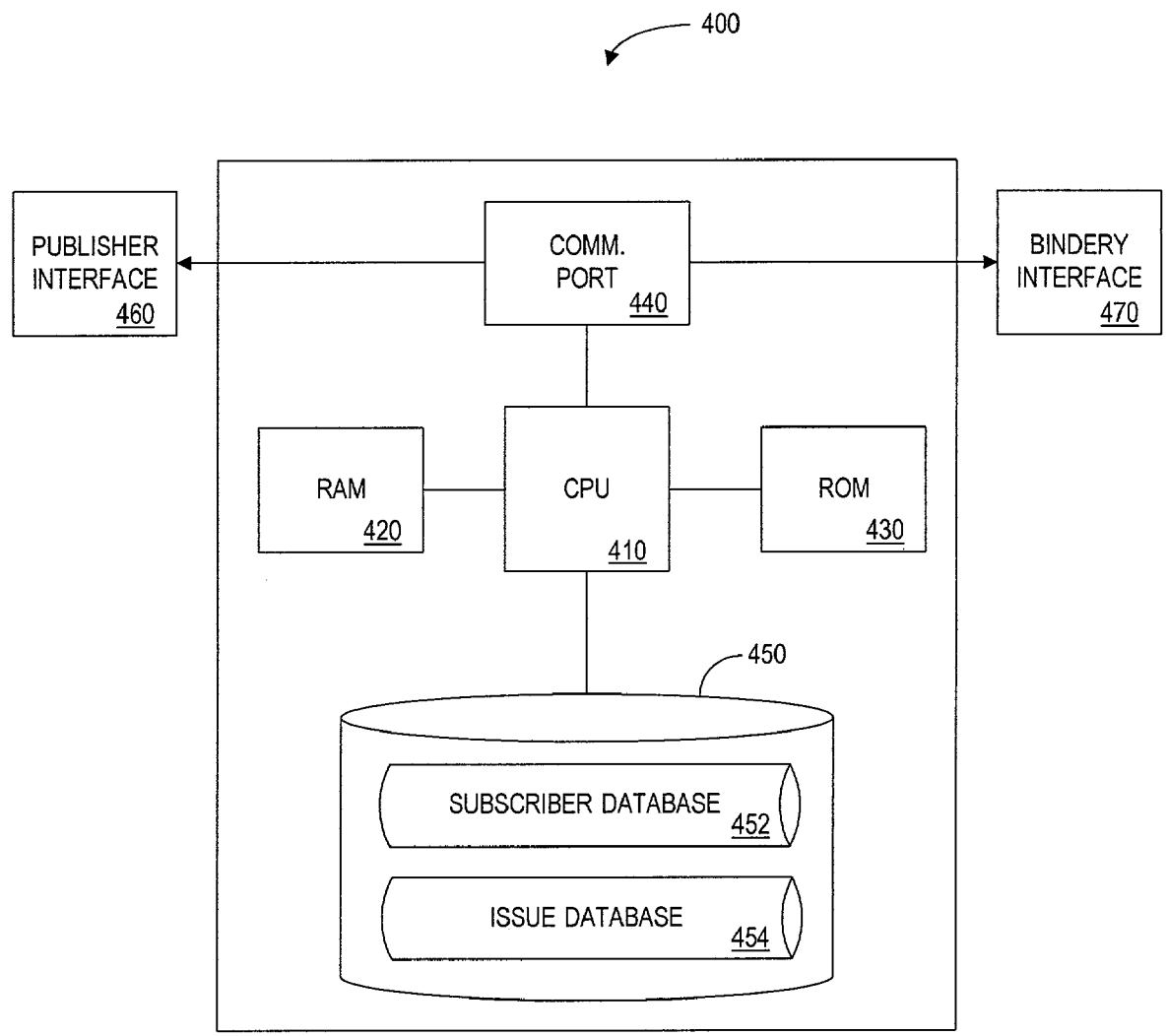
FIG. 4 shows a block diagram of central controller 400 located at fulfillment house 130 shown in FIG. 1.

FIG. 4 illustrates a preferred embodiment of central controller 400. As shown in FIG. 4, central controller 400 preferably includes certain conventional components, such as CPU 410, RAM 420, ROM 430, communications port 440, and data storage device 450. CPU 410 is coupled to the other elements and executes program code stored in RAM 420, ROM 430, and/or data storage device 450 to facilitate the functions and operations of central controller 400. Communications port 440 facilitates electronic communication with central controller 400 and, as shown in FIG. 4, is coupled to publisher interface 460 and bindery interface 470, which connect to publisher 120 and the bindery, respectively.

Data storage device 450 maintains several databases, including subscriber database 452 and issue database 454. These databases preferably contain the same or similar data as stored in databases 253 and 255, respectively. CPU 410 is capable of accessing the data stored in data storage device 450.

Distribution channel 140 represents one or more conventional entities which provides delivery service (e.g., postal delivery, parcel delivery, courier) and that delivers magazines containing customized indexes received from fulfillment house 130 to respective subscribers. Distribution channel 140 preferably operates in a manner that facilitates conventional modes of magazine distribution, such as home or office delivery for subscribers or delivery to a retail outlet for subscriber pick-up.

Operation of the System

Consistent with the invention, various operations of system 100 are now described in connection with the flowcharts illustrated in FIGS. 5-7.

Figure 5:
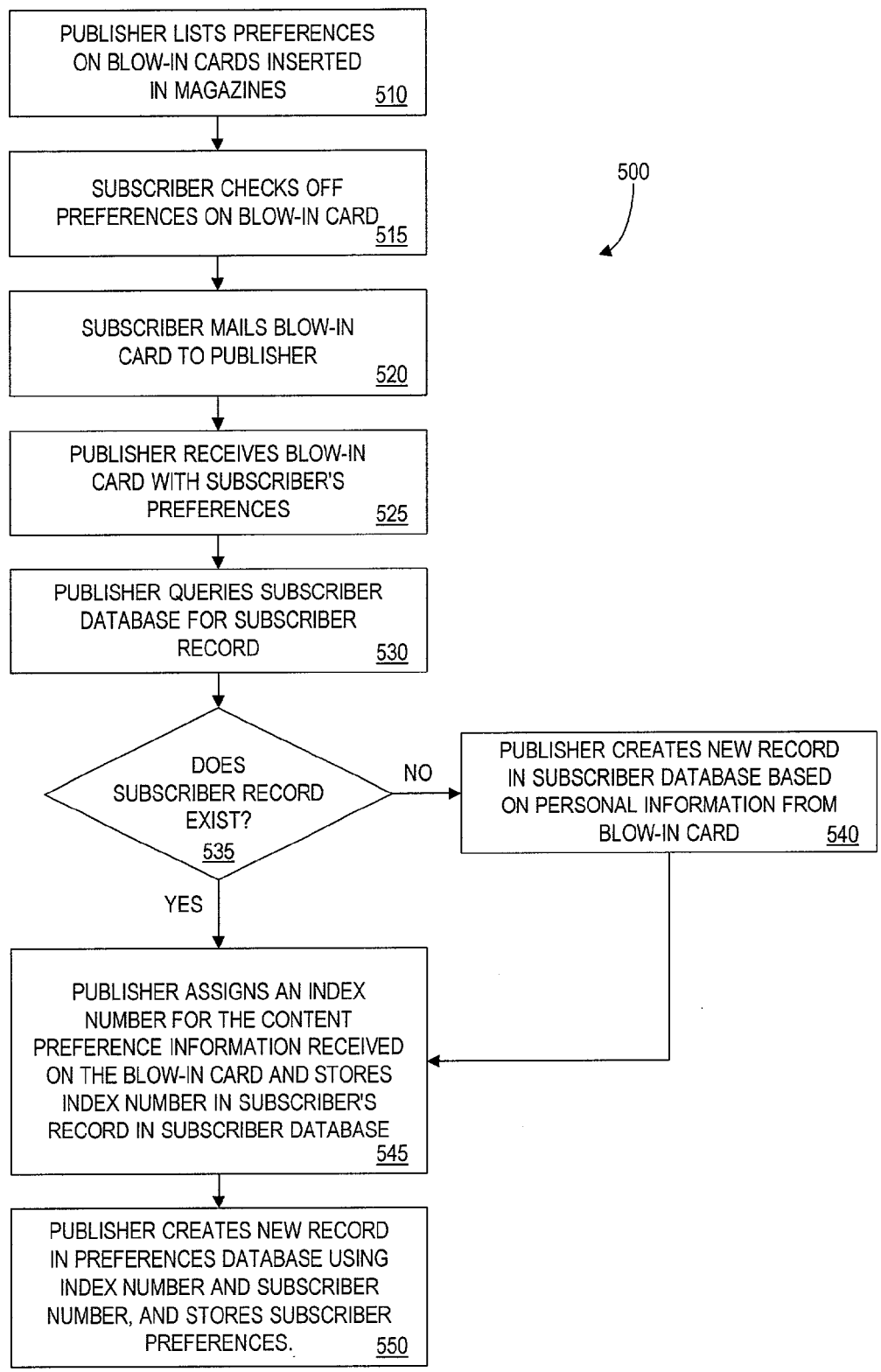
FIG. 5 shows flowcharts representing a process in which a subscriber provides subscriber information and preferences to a publisher for entry into subscriber database 253 and preferences database 254.

FIG. 5 contains flowchart 500 depicting a process in which a subscriber provides subscriber information and personal preferences to a publisher and the publisher enters the subscriber information. Publisher 120 lists preferences on blow-in, bind-in, or subscription cards inserted in magazines (step 510). Such cards are conventionally used by subscribers to mail in magazine subscription orders and are inserted into magazines using known methods. In one embodiment, these cards contain space for subscribers to fill in subscriber information (e.g., subscriber name, address, subscription duration, and payment information) as well as a list of personal preferences relating to magazine article attributes from which subscribers may select. Subscriber 110, who receives one of the blow-in cards, checks off or lists the preferences in which he is interested (step 515).

Subscriber 110 returns the completed blow-in card to publisher 120 by, for example, mailing the card (step 520). Publisher 120 receives the mailed blow-in card with the subscriber's personal preferences (step 525) and queries subscriber database 253 to determine whether a subscriber record exists for subscriber 110 (step 530). If a subscriber record does not exist for subscriber 110 (step 535), publisher 120 creates a new record in subscriber database 253 using the subscriber information provided on the received blow-in card (step 540). This new record is created in a conventional manner by, for example, entering subscriber information into subscriber database 253. Publisher 120 also assigns a subscriber number to subscriber 110, which is stored in subscriber 110's record as well.

Following step 540, or step 530 if a subscriber record already exists, publisher 120 assigns an index number for the content preference information received on the blow-in card and stores an index number in the subscriber's record in subscriber database 253. (step 545). Publisher 120 creates a record in preferences database 254 using the index number and subscriber 110's subscriber number stored in subscriber database 253 and stores preferences contained on the received blow-in card (step 550). In a preferred embodiment, the preferences are entered as preference codes according to a coding scheme in which the preference codes represent desired attributes of articles of interest. As previously mentioned with regards to the content of the magazine, the subscriber preferences could be stored as received in text format and not coded to allow for a different type of query to be performed. Of course, subscriber preferences could be stored according to a coding scheme as well as in text format.

The above-described process for communicating subscriber preferences to publisher 120 using blow-in or subscription cards constitutes one implementation of the invention. In alternative implementations, the subscriber preferences may be communicated using other conventional communication devices, such as the telephone (via VRU or live operator), facsimile, electronic mail and the Internet.

Figure 6:
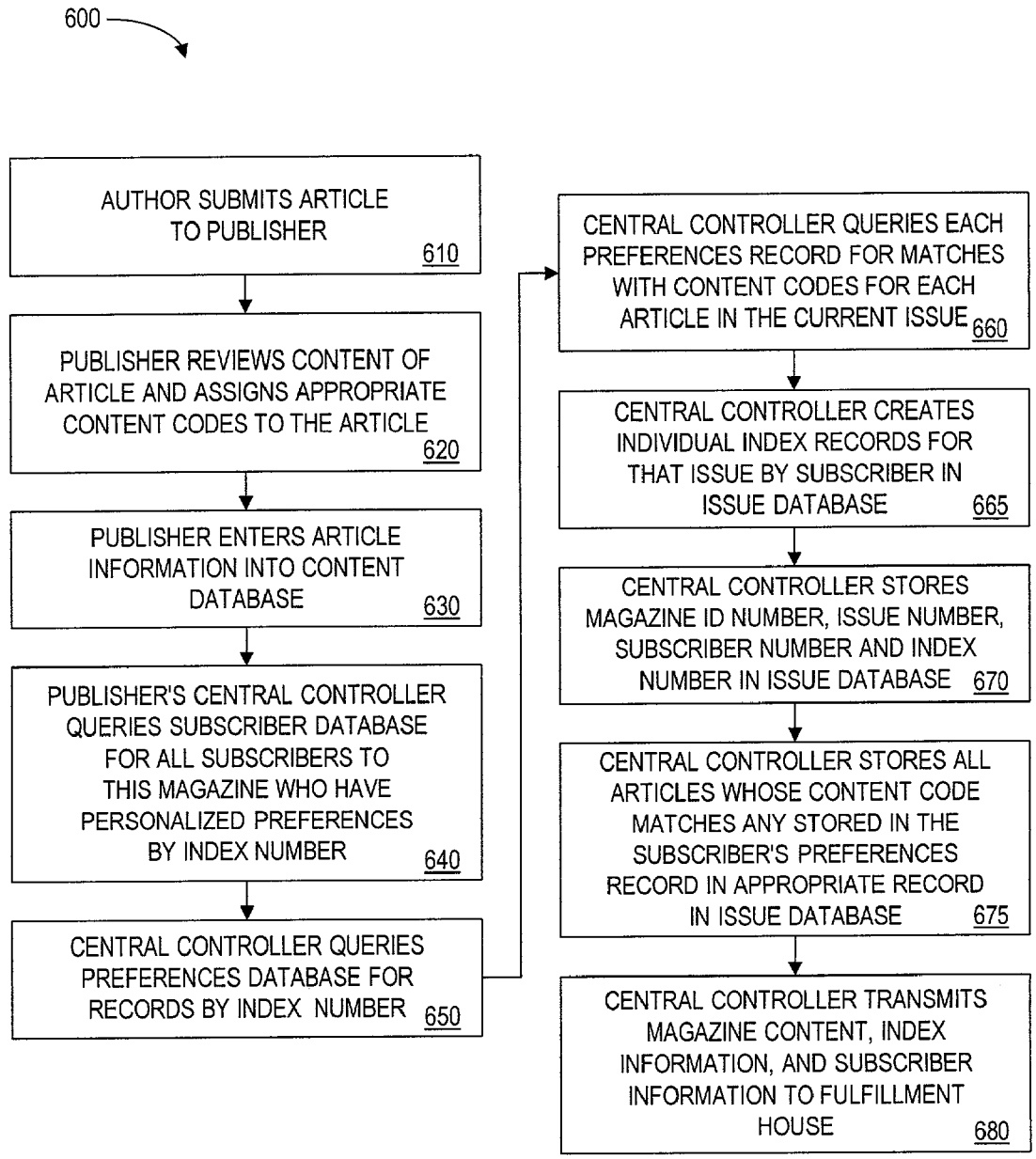
FIG. 6 shows a flowchart representing a process in which the publisher receives and processes content information of a magazine.

FIG. 6 shows flowchart 600 representing a process in which publisher 120 receives and processes the content information of a magazine. An author submits his article to publisher 120 (step 610), which reviews the content of the article and assigns appropriate content codes to the article (step 620). The content codes may be assigned according to an appropriate coding scheme, preferably compatible with the coding scheme employed for the preference codes. These content codes are generally assigned to reflect the content of the article. Publisher 120 enters article information into content database 252 (step 630). Examples of article information include the magazine ID number of the magazine in which the article will appear, the article title, any corresponding hyper-footnote(s), appropriate content code(s), the author, and the page number at which the article will appear in the magazine.

Central controller 200 may also assign an article identifier to the article and store the identifier in content database 252.

Publisher 120's central controller 200 queries subscriber database 253 to determine the index numbers for the subscribers of a magazine for which personal preferences are stored in preferences database 254 (step 640).

Central controller 200 then queries preferences database 254 by index number for records (step 650). Alternatively, preferences database 254 may be queried by customer number (e.g., where a subscriber only has one associated preferences record). Central controller 200 then queries each preferences record for matches with content codes for each article in the current issue (step 660).

Alternatively, central controller 200 may seek matches for articles in issues other than the current issue, or for articles in a different magazine.

In an alternative embodiment, neither the content nor the preferences may have codes associated with them. In this embodiment the controller performs an intelligent query of the magazine content based on the preferences of the subscriber. The index is created, using a weighting method whereby the controller determines the relevance of any reference.

For example, the subscriber indicates a name or a company (e.g., "Company A") in his list of preferences. The controller is programmed to query the magazine for all content where Company A is mentioned more than once within ten words of B, where B is some additional piece of preference information. For instance, the subscriber wants to see any articles about "Microsoft" relevant to the Internet in Wired magazine. The controller would query the content record for Wired in search of any articles that mention "Microsoft". Once the articles have been identified the controller would again query for "Microsoft" within three words of "internet" to determine the relevance of the article.

Once the articles of interest are identified, central controller 200 creates individual index records for each subscriber receiving that issue in issue database 255 (step 665). Central controller 200 stores magazine ID number, issue number, subscriber number, and index number in issue database 255 (step 670). Central controller 200 stores all articles whose content code matches any stored in the subscriber's preference record in issue database 255 (step 675).

For example, according to various embodiments, central controller 200 stores information about each of the indexed articles, such as, for example, the article name, the author, an article summary, content codes, corresponding hyper-footnotes, and/or corresponding page numbers associated with articles. According to alternative or additional embodiments, central controller 200 stores an identifier for each article whose content code(s) matches any content of interest to the subscriber, as indicated in the preference record. Information for each indexed article may thus be found by querying content database 252 using the article identifier. Alternatively, or in addition, central controller 200 stores the full text of each indexed article.

Central controller 200 transmits magazine content, index information, and subscriber information to fulfillment house 130 (step 680). This transmission may be carried out by mailing printouts, or documentation, containing this information or by electronic transmission, such as modem, network connection, or wireless transmission.

Figure 7:
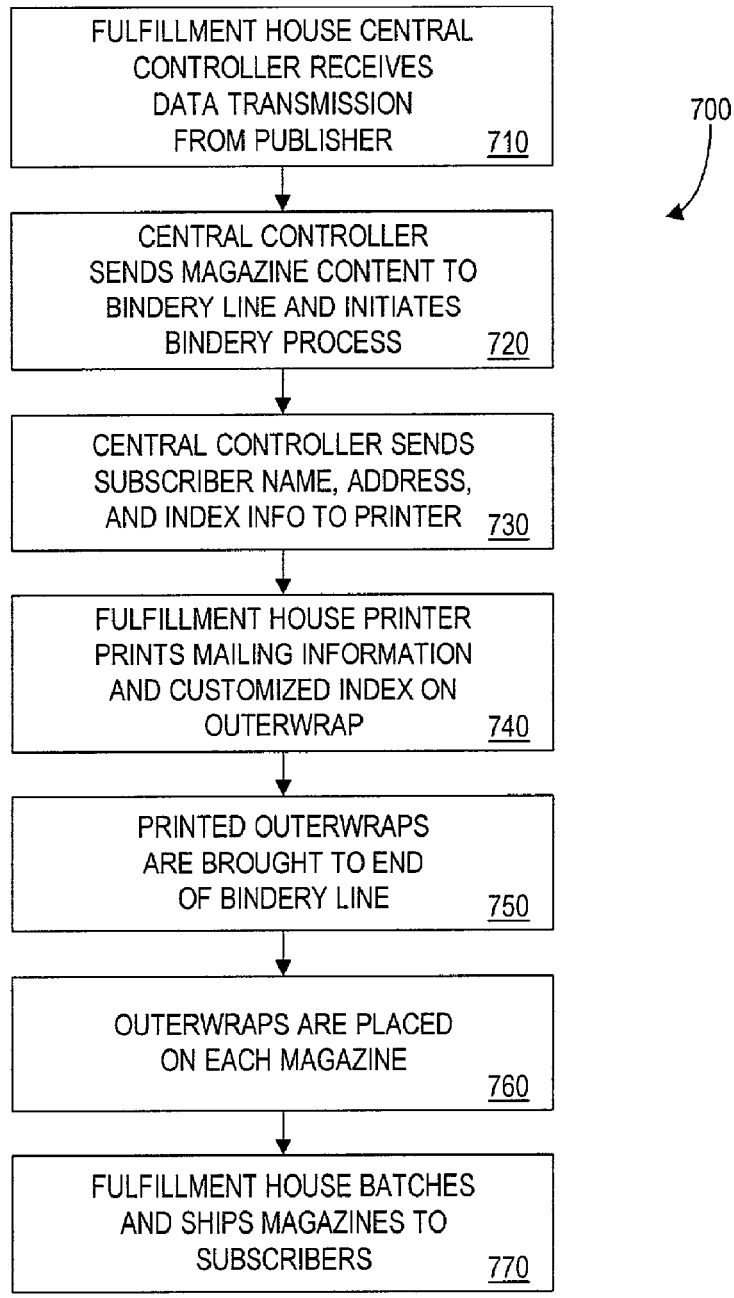
FIG. 7 shows a flowchart representing a process in which the fulfillment house processes index information received from the publisher to construct magazines with customized indexes.

FIG. 7 shows flowchart 700 representing a process in which fulfillment house 130 processes the personalized index information to construct magazines with customized indexes. Central controller 400 receives the data transmission, including the content and index information, from publisher 120 (step 710). Central controller 400 sends the content information to a bindery line to initiate the bindery process of constructing magazines (step 720) and transmits subscriber name, address, and customized index information to a printer preferably located toward the end of the bindery line (step 730).

The printer prints mailing information and a customized index on an outer wrap (step 740), which is placed at the end of the bindery line (step 750) and attached to the respective magazines (step 760). In an alternative embodiment, the printer could print the mailing information and/or the customized index directly on or in the magazines without using an outer wrap. As previously mentioned, the index could be transmitted to the subscriber via facsimile, electronic mail, the Internet, phone, or any suitable means for communication. The related information necessary to perform such a transmission would be stored in the appropriate database, accessed accordingly, and used to execute the delivery. Fulfillment house 130 batches and ships the completed magazines, with the customized indexes, to respective subscribers, including subscriber 110 (step 770). This shipment may include conventional modes of delivering magazines, including mail, special delivery, and pick up.

Although many of the embodiments have been described herein as being directed to one magazine, or to one issue of a magazine, various embodiments of the present invention provide for creating a customized index for a subscriber that includes index data related to one or more issues of a particular periodical. For example, a customized index attached to an Issue 10 of Periodical A may also include index data for Issue 01 of Periodical A. This might motivate the subscriber to attain a copy of Issue 01. In additional embodiments, a customized index may include index data for one or more periodicals. For example, a customized index attached to an issue of Periodical B may include index data corresponding to one or more issues of Periodical A. In this way, a publisher may encourage a subscriber to one periodical to seek out and possibly subscribe to another periodical.

Methods and systems consistent with the present invention allow subscribers to receive periodicals, such as magazines, for which custom indexes are provided. The indexes identify the standard printed content contained in one or more periodicals that match respective subscribers' preferences. In this way, a subscriber can quickly identify whether a periodical contains standard printed content of interest to him, what the standard printed content is, and where in the magazine it is located.

To achieve these and other advantages and in accordance with the purpose of the invention, as embodied and broadly described, a system consistent with this invention comprises various methods of manufacturing a customized index for use with a periodical. One method comprises the steps of receiving personal preference data indicative of at least one content category of interest to a subscriber; receiving content data relating to the standard printed content of a periodical; comparing said content data with said personal preference data; generating index data based upon said comparison; and outputting a customized index containing said index data for use with said periodical. The customized index may be attached to a periodical, thereby providing a periodical having a customized index to standard content.

According to other embodiments, an index for use with a periodical is delivered to a subscriber. The index is customized to identify standard printed content of interest to a subscriber according to preselected personal preferences indicative of at least one content category of interest to a subscriber, the identified standard printed content of interest being contained in the periodical.

The present invention also provides a practical and economically feasible system for publishers to indicate to their readers the availability of valuable supplement information, which is often developed in the routine process of business but otherwise wasted, related to information found in print material. This is accomplished by providing readers with hyper-footnotes in a customized index, a simple means to identify whether supplemental information exists that relates to standard printed content of interest to the subscriber.

Conclusion

It will be apparent to those skilled in the art that various modifications and variations can be made in the method and system of the present invention without departing from the spirit or scope of the invention. The present invention covers the modifications and variations of this invention provided they come within the scope of the appended claims.

The invention claimed is:

1. A method comprising:
receiving first data corresponding to standard printed content of a periodical;
receiving second data indicating at least one content preference of a subscriber of the periodical;
generating customized index data based on a comparison of the first data and the second data, in which the customized index data identifies first content included in the standard printed content and includes at least one of an article title and a page number; and
printing a customized index for the subscriber, the customized index including the customized index data.

2. The method of claim 1, wherein the printing comprises: printing the customized index on an outer wrap.

3. The method of claim 2, further comprising:
attaching the outer wrap to the periodical; and
mailing the periodical to the subscriber.

4. A method, comprising:
determining at least one preference associated with a subscriber of a periodical;
determining a correlation between the at least one preference and at least a portion of standard printed content of an issue of the periodical;
generating a customized index for the subscriber that is associated with the issue of the periodical, the customized index including an indication of at least one article contained in the periodical, the indication comprising at least one of an article title and a page number; and
providing the customized index to the subscriber, wherein the customized index is separate from the standard printed content of the issue of the periodical.

5. The method of claim 4, in which generating the customized index further comprises printing the customized index on at least one of the outside of the periodical, the inside of the periodical, on an outer wrap for attachment to the periodical, and on an insert.

6. The method of claim 4, in which providing the customized index to the subscriber comprises at least one of mailing the periodical with the customized index, delivering the customized index via facsimile, delivering the customized index via electronic mail, delivering the customized index via telephone, and providing access to the customized index to the subscriber via the Internet.

7. The method of claim 4, in which determining at least one preference comprises:
determining subscribers of a periodical; and
determining if at least one preference is associated with at least one of the subscribers of the periodical.

8. The method of claim 7, in which at least one of determining subscribers of a periodical and determining at least one preference comprises searching at least one database.

9. The method of claim 4, wherein the customized index further comprises at least one content code that represents an attribute associated with the content of an article of the periodical.

10. The method of claim 9, wherein the content code represents at least one of a company, an industry, a person, and a geographic area.

11. The method of claim 9, wherein the content code represents at least one of a product information, a summary, and an editorial.

12. A system, comprising:
means for determining at least one preference associated with a subscriber of a periodical;
means for determining a correlation between the at least one preference and at least a portion of standard printed content of an issue of the periodical;
means for generating a customized index for the subscriber that is associated with the issue of the periodical, the customized index including an indication of at least one article contained in the periodical, the indication comprising at least one of an article title and a page number; and
means for providing the customized index to the subscriber, wherein the customized index is separate from the standard printed content of the issue of the periodical.

13. The system of claim 12, wherein the means for generating the customized index comprises a printer configured to print the customized index on at least one of the outside of the periodical, the inside of the periodical, on an outer wrap for attachment to the periodical, and on an insert.

14. The system of claim 12, wherein the means for providing the customized index to the subscriber comprises a controller for at least one of mailing the periodical with the customized index, delivering the customized index via facsimile, delivering the customized index via electronic mail, delivering the customized index via telephone, and providing access to the customized index to the subscriber via the Internet.

15. A method, comprising:
determining a first preference associated with a first subscriber of a periodical;
determining a correlation between the first preference and at least a first portion of standard printed content of an issue of the periodical;
determining a second preference associated with a second subscriber of the periodical;
determining a correlation between the second preference and at least a second portion of the standard printed content of the issue of the periodical, wherein the second portion is different from the first portion;

generating a first customized index associated with the first portion of the standard printed content of the issue of the periodical, and a second customized index associated with the second portion of the standard printed content of the issue of the periodical; and providing the first customized index to the first subscriber and the second customized index to the second subscriber.

16. The method of claim 15, wherein each of the first customized index and the second customized index is separate from the standard printed content of the issue of the periodical.

17. The method of claim 15, in which generating the first customized index and the second customized index comprises providing an indication of at least one article contained in the issue of the periodical, the indication comprising at least one of an article title and a page number.

18. The method of claim 15 in which determining the first preference and the second preference comprises:
   determining subscribers of a periodical; and
   determining if at least one preference is associated with each of the first and second subscribers.

19. The method of claim 18, in which at least one of determining the subscribers of a periodical and determining if at least one preference is associated with a subscriber comprises searching at least one database.

20. The method of claim 15, wherein the first portion of the standard printed content of the issue of the periodical corresponds to a first article, and the second portion of the standard printed content of the issue of the periodical corresponds to a second article.

21. The method of claim 15, wherein at least one of the first customized index and the second customize index further comprises at least one content code that represents an attribute associated with the content of an article of the periodical.

22. The method of claim 21, wherein the content code represents at least one of a company, an industry, a person, and a geographic area.

23. The method of claim 21, wherein the content code represents at least one of a product information, a summary, and an editorial.

24. The method of claim 15, in which generating at least one of the first customized index and the second customized index comprises printing the customized index on at least one of the outside of the periodical, the inside of the periodical, on an outer wrap for attachment to the periodical, and on an insert.

25. The method of claim 15, in which providing the first customized index and the second customized index to at least one of the first subscriber and the second subscriber farther comprises at least one of mailing the periodical and customized index, delivering the customized index via facsimile, delivering the customized index via electronic mail, delivering the customized index via telephone, and providing access to the customized index via the Internet.

26. The method of claim 15, further comprising storing the first preference and the second preference in a database with subscriber data.

27. The method of claim 26, wherein the subscriber data comprises at least one of a subscriber number, a name, an address, a phone number, a financial account number, a magazine identifier, an index number, and a subscription expiration date.

28. A system, comprising:
   means for determining a first preference associated with a first subscriber of a periodical;
   means for determining a correlation between the first preference and at least a first portion of standard printed content of an issue of the periodical;
   means for determining a second preference associated with a second subscriber of the periodical;
   means for determining a correlation between the second preference and at least a second portion of the standard printed content of the issue of the periodical, wherein the second portion is different from the first portion;
   means for generating a first customized index associated with the first portion of the standard printed content of the issue of the periodical, and a second customized index associated with the second portion of the standard printed content of the issue of the periodical; and
   means for providing the first customized index to the first subscriber and the second customized index to the second subscriber.

29. The system of claim 28, wherein the means for generating the first customized index and the second customized index comprises a printer configured to provide an indication of at least one article contained in the issue of the periodical, the indication comprising at least one of an article title and a page number.

30. The system of claim 29, wherein the printer is further configured to provide an indication of at least one content code that represents an attribute associated with the content of an article of the periodical.

31. The system of claim 29, wherein the printer is configured to print the at least one of the first customized index and the second customized index on at least one of the outside of the periodical, the inside of the periodical, on an outer wrap for attachment to the periodical, and on an insert.

32. The system of claim 28, wherein the means for determining the first preference and the second preference comprises a controller configured to determine subscribers of a periodical, and to determine if at least one preference is associated with each of the first and second subscribers.

* * * * *